United States Patent [19]

Förster

[11] 4,229,257
[45] Oct. 21, 1980

[54] METHOD OF OPERATING A NUCLEAR POWER INSTALLATION AND A POWER PLANT ADAPTED FOR SUCH OPERATION

[75] Inventor: Siegfried Förster, Alsdorf, Fed. Rep. of Germany

[73] Assignee: Kernforschungsanlage Jülich Gesellschaft mit beschränkter Haftung, Jülich, Fed. Rep. of Germany

[21] Appl. No.: 911,316

[22] Filed: Jun. 1, 1978

[30] Foreign Application Priority Data

Jun. 2, 1977 [DE] Fed. Rep. of Germany ....... 2724812

[51] Int. Cl.² .................. G21C 15/22; F01K 23/04
[52] U.S. Cl. ................................. 176/60; 60/652; 60/655
[58] Field of Search .............. 176/60, 65; 60/644, 60/652, 655

[56] References Cited

U.S. PATENT DOCUMENTS

| | | | |
|---|---|---|---|
| 3,377,800 | 4/1968 | Spillmann | 176/60 |
| 3,851,474 | 12/1974 | Heller et al. | 60/655 |
| 3,943,719 | 4/1976 | Terry et al. | 60/655 |
| 3,974,029 | 8/1976 | George et al. | 176/60 |
| 4,041,709 | 8/1977 | Rajakovics | 60/655 |
| 4,048,012 | 9/1977 | George et al. | 176/60 |
| 4,052,260 | 10/1977 | Forster et al. | 176/60 |

FOREIGN PATENT DOCUMENTS 936856  9/1963  United Kingdom ............. 176/60

Primary Examiner—S. A. Cangialosi
Attorney, Agent, or Firm—Karl F. Ross

[57] ABSTRACT

A primary working gas is heated in a high-temperature nuclear reactor and drives at least one primary turbine set to operate an electrical generator to generate electric power. Heat is abstracted from the primary gas by recuperative heat exchange and the primary gas is compressed and heated by the recuperative heat exchange and introduced into the nuclear reactor for further heating therein. Upon the development of an increased electrical power demand, a secondary gas is heated by the recuperative heat exchange and drives an auxiliary turbine set and electric power generator to supply this peak demand.

11 Claims, 2 Drawing Figures

METHOD OF OPERATING A NUCLEAR POWER INSTALLATION AND A POWER PLANT ADAPTED FOR SUCH OPERATION

FIELD OF THE INVENTION

The present invention relates to a method of operating a nuclear power plant and, more particularly, a nuclear power plant using a high-temperature nuclear reactor. The invention also relates to a nuclear reactor for operation by the special method of the present invention.

BACKGROUND OF THE INVENTION

It is known, in the generation of electric power by nuclear energy, to provide a nuclear power plant with a high-temperature nuclear reactor in which a working gas, circulated over a closed path, is heated.

The working gas drives, via a turboset, one or more generators to produce the electrical energy.

A "turboset" as this term is used in the description can include one or more compressors connected by a common shaft to one or more turbines whose shaft is, in addition, coupled directly or indirectly to a generator. The compressors may be single or multi stage. The turbines may also be single or multi stage.

The closed circulating path for the working fluid includes one or more recuperative heat exchangers to effect a heat exchange between the expanded and the compressed working gases and for removal of residual heat before the compression of the working gas in the compressor.

A nuclear power plant operating with a closed working-gas cycle is described, for example, in German published application (Auslegeschrift) DT - AS No. 15 39 904 which operates in the manner described above but is incapable of effectively compensating for variations in the energy requirements of the consuming side of the system. In other words, with increasing energy demand or decreasing energy demand, the efficiency of the plant drops markedly.

In order to improve the efficiency of such a plant it is obviously necessary to be able to, in short order, increase the available generated power or decrease the power which must be generated. Furthermore, the conventional system as described in the aforementioned patent and others of similar type are extremely expensive both with respect to the capital cost and the operating cost.

OBJECTS OF THE INVENTION

It is the principle object of the present invention to provide a power generating plant using a high-temperature nuclear reactor and a closed working-gas cycle, whereby the disadvantages of the earlier systems can be eliminated.

It is another object of the invention to provide an improved method of operating a nuclear power plant using a high temperature reactor to heat a working gas.

It is also an object of the invention to provide a method of operating a nuclear power plant which enables the investment or capital cost of the plant to be reduced, high energy outputs to be achieved and the plant to respond to changes in the peak demand readily and with a minimum of difficulty.

Still another object of the invention is to provide an improved nuclear-power generating apparatus which is capable of covering changes in the peak demand of the electrical energy used thereby.

SUMMARY OF THE INVENTION

These objects and others which will become apparent hereinafter are attained, in accordance with the present invention, in a system of the afore-described type, i.e. wherein a high-temperature nuclear reactor is disposed along a closed working gas cycle to heat the working fluid, the cycle also includes the afore-mentioned heat exchanger means, compressor means, turbine means and generator means, and generally is operated in the manner described. According to the improvement of the present invention, a part of the working gas expanded in the turbine means is used to heat a working fluid of an additional fluid cycle including a turboset and generator.

According to the principles of this invention, therefore, an increase in the electrical energy which must be generated can be effected simply by operating the high temperature reactor with increased thermal output, with the increased thermal output being supplied via the primary fluid to an additional working fluid cycle and transformed into electrical energy via the auxiliary turbine and generator in this additional working cycle.

This allows additional power recovery at minimal cost because the usual system of the high temperature reactor is used at its rated capacity and only additional demand must be handled by the secondary or additional current-generating system. Preferably, the expanded primary working gas is used to heat the secondary fluid of the associated secondary cycle.

The secondary fluid for this secondary fluid circulation path can be passed through the recuperative heat exchanger until it reaches the desired temperature level which corresponds to optimum efficiency in the generating system of the secondary cycle. The working pressure range of the secondary fluid and the secondary cycle is thus freely selectable.

In order to carry out the method of the present invention, I can make use of a nuclear power plant in which the primary working gas is heated in the high temperature reactor and is circulated in a closed working cycle as the sole energy abstractor from the high temperature reactor. In other words, the secondary working fluid does not pick up energy directly from the high temperature reactor.

According to the apparatus aspects of the invention, the primary working gas cycle includes one or more turbosets which are traversed by the primary working gas and each of which drives one or more generators. The turbosets, if more than one are provided, are connected in parallel. Each turboset includes a turbine and, upon the same working shaft thereof, at least one single or multi stage compressor. The working gas cycle includes, preferably, a plurality of parallel-connected recuperative heat exchangers to effect heat exchange between the expanded and the compressed gas. Ahead of the compressor there is additionally provided a cooler for abstracting residual heat from the working gas.

The nuclear power plant of the present invention is also characterized, according to an essential feature of the invention, by providing a gas outlet of at least one of the recuperative heat exchangers for the heated compressed primary gas, with a gas inlet fitting connected to an expansion turbine of an additional turbine set via any requisite branch ducting.

The working gas from the outlet fitting of the turbine is connected to a cooler which, in turn, is supplied to a gas inlet fitting of a compressor of this latter turbine set, the outlet of the compressor feeding back the gas to the inlet of the recuperative heat exchanger which serves to divert a portion of the thermal energy carried by the primary gas to the secondary circulation. In its most advantageous embodiment, the working gas heated in the high temperature reactor thus serves to supply the additional energy required to meet the peak loads.

In a variant of the present invention, a portion of the primary working gas is not diverted in the manner described immediately above but the recuperative heat exchanger from which some of the thermal energy is to be shunted to the auxiliary cycle, is provided with a chamber traversed by a secondary gas. For the compressed working gas, there is provided a bypass duct including a throttle, connected across the regenerative heat exchanger.

In this case, the secondary cycle may use a fluid particularly adapted for efficient energy generation at the maximum temperature attainable upon heating in the recuperative heat exchanger and at the operating pressure of the secondary cycle.

The secondary fluid cycle is a source of additional electric power which is derived by increasing the thermal output of the high temperature reactor.

Normally, the energy-generating gas cycle is dimensioned for maximum energy output and, although the high temperature reactor can briefly be operated at higher thermal outputs, the working gas cycle is incapable of efficiently transforming the additional thermal output into electrical energy. With the system of the present invention, a more optimum utilization of the high temperature reactor can be obtained.

According to still another feature of the invention, one or more of the turbine sets may be provided with auxiliary turbines for enhanced electrical energy output without exceeding the maximum working gas temperature or pressure in the high temperature reactor.

BRIEF DESCRIPTION OF THE DRAWING

The above and other objects, features and advantages of the present invention will become more readily apparent in the following description, reference being made to the accompanying drawing in which.

SPECIFIC DESCRIPTION

The nuclear power plant of the present invention comprises a high-temperature nuclear reactor 1 designed to heat a circulating working gas which is expanded in a turbine 2 and traverses a plurality of recuperative heat exchangers 3 as previously described.

Figure 1:
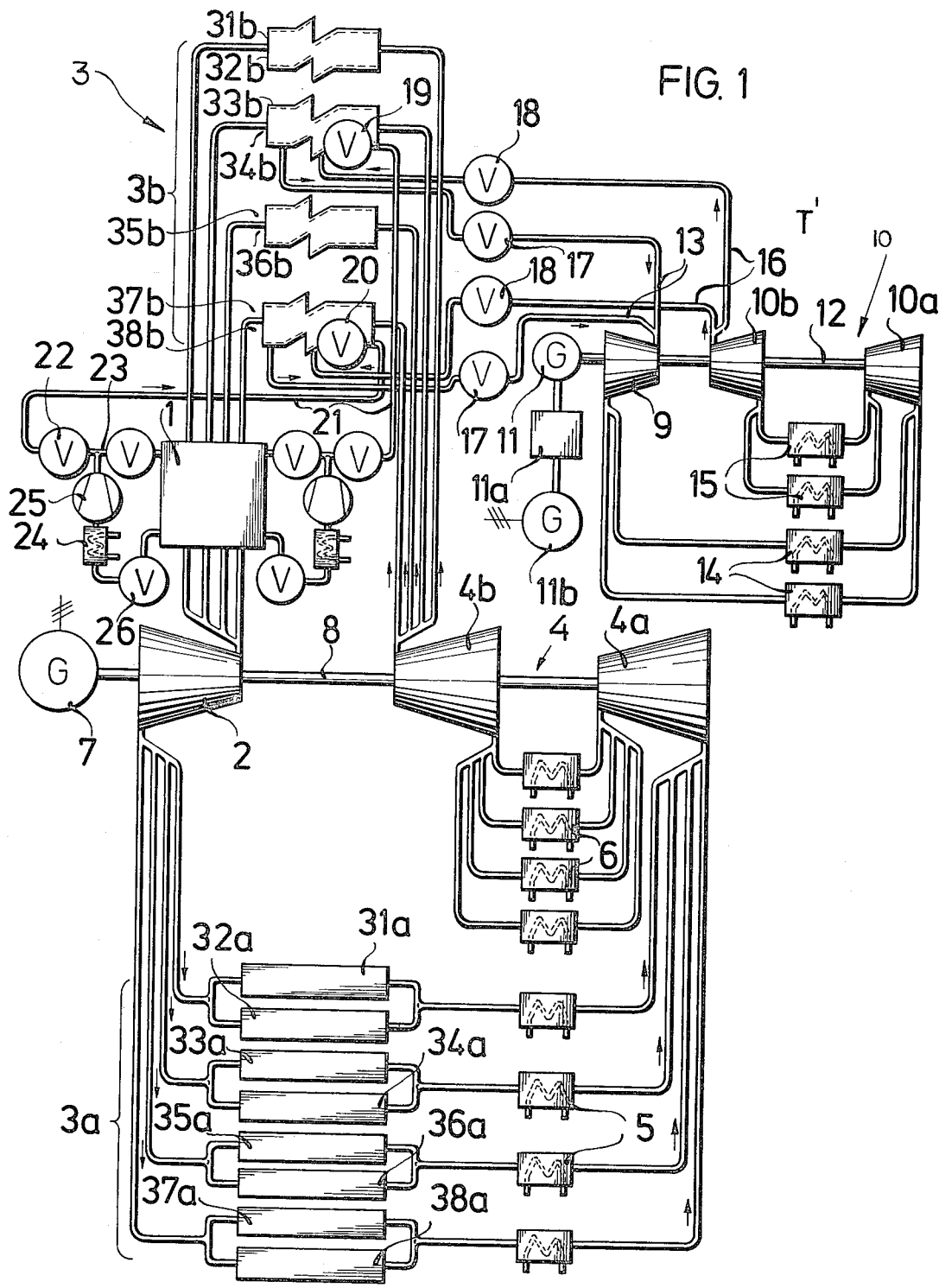
FIG. 1 is a flow diagram illustrating a nuclear power plant according to the invention provided with an auxiliary working cycle for meeting brief increases in peak demand.

The turbine set shown in FIG. 1 is representative of one or more such sets which can be connected in parallel, each turbine set including a common shaft 8 driving the generator 7 and compressors 4a and 4b. The turbine 2 may represent a single-stage or multi-stage turbine. Each of the compressors 4a and 4b represents a single-stage compressor or a multi-stage compressor.

Figure 2:
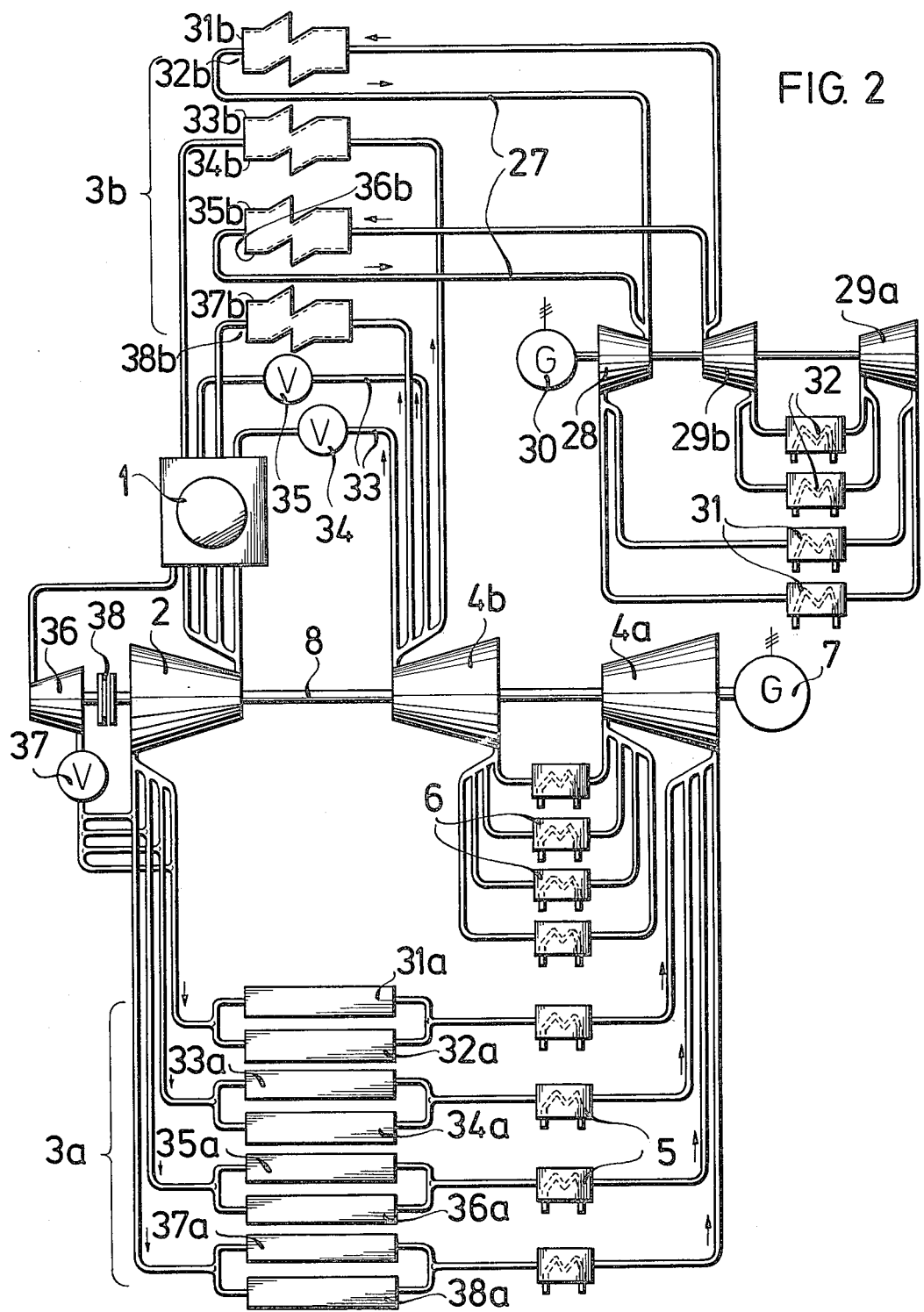
FIG. 2 is a similar diagram of a nuclear power plant embodying the invention in accordance with another feature thereof.

In FIGS. 1 and 2, the recuperative heat exchanger 3 has been shown diagrammatically, subdivided into sections 3a and 3b and with the various flow cross-sections separately represented.

For example, the portion of the regenerative heat exchanger 3 which is traversed by the expanded working gas has been represented at 3a and comprises the discrete flow cross-sections 31a–38a. The flow cross-section traversed by the compressed gas has been represented at 3b and is subdivided into flow cross-sections 31b . . . 38b.

In the recuperative heat exchanger 3, a portion of the heat which is retained by the expanded working gas after it traverses the turbine 2, is transferred to the compressed working gas.

The compression of the working gas is effected in a low-compression stage 4a and a high-pressure stage 4b by the respective compressors. The compressor means generally has been represented at 4.

Ahead of the inlet to the low-pressure stage 4a and ahead of the inlet to the high-pressure stage 4b, the working gas may be cooled in a plurality of parallel-connected coolers 5 and 6. The cooling medium for these units may be water.

The rotor of the turbine 2, the rotors of the compressors 4a, 4b of the compressor means 4, and the rotor of the generator 7 are connected to the common shaft 8.

The aforedescribed circulating path is the primary or main gas circulation of the system. In general, the high temperature gas from the high-temperature nuclear reactor 1 traverses the turbine (or turbines) 2 of the turbine set (or turbine sets) before passing through the flow cross-sections 31a–38a of the heat exchanger 3. The thus cooled gas can be further cooled in the heat exchangers or coolers 5 before entering the compressors 4a. From the compressors 4a, the gas passes through the coolers 6 at which compression heat is removed before the gas enters the high pressure stage 4b. The highly compressed gas then traverses the flow cross-sections 31b–38b of the recuperative heat exchanger 3b in which the temperature of the gas is raised still further and is admitted to the high-temperature nuclear reactor 1 where its temperature and pressure are brought up to the optimum level for energy generation.

As has been mentioned previously, this main operating cycle or circulation path has been shown with only a single turbine set and generator. It is customary, however, to provide nuclear power plants operating under the principles set forth with a plurality of such turbine sets connected in parallel in the main gas circulating flow.

FIG. 1 shows an embodiment of the present invention in which the main gas circulation path is complemented by a secondary working cycle traversed by the same working gas for meeting peak power demands which are in excess of the normal output of the generator means 7.

In this embodiment, the secondary working cycle includes a turbine 9 forming part of a turbine set with a low-pressure stage or compressor 10a and a high-pressure stage or compressor 10b.

The compressors 10a and 10b together include a compressor means (secondary compressor means) 10. The rotors of the turbine 9, the low-pressure compressor 10a and the high-pressure compressor 10b as well as the auxiliary or secondary generator 11 are connected to a common shaft 12. The assembly forms the auxiliary turbine set T'.

The working gas for the secondary circulation path is a portion of the main gas which, after traversing the recuperative heat exchanger sections 34b and 38b, is diverted.

In other words, outlet portions of the flow cross-sections 34b and 38b are connected via valves 17 to the inlets of the auxiliary turbine 9. The gas outlets of this turbine are connected through coolers 14 (analogous in function to the coolers 5) which are provided at the inlets of te low-pressure compressor 10a. Between the low-pressure compressor 10a and the high-pressure compressor 10b, further coolers 15 are provided which function similarly to the coolers 6 previously mentioned. From the high-pressure compressor 10b, the gas is returned via lines 16 and valves 18 to inlet sides of the flow cross-sections 34b and 38b, downstream of valves 19 and 20, respectively. The lines 13 connect the flow cross-sections 34b and 38b with the compressor 9.

It will be apparent that the multiple connections between the turbine 9 and the flow cross-sections of the heat exchanger 3, etc., permit alternative flow through the respective flow cross-sections of the recuperative heat exchanger, i.e. the heating of one of these flow cross-sections while the other is being used for heat exchange with the gas which is fed to the auxiliary turbine. Naturally, both flow cross-sections may be used together when the output of the auxiliary flow cross-section is to be increased.

The coolant in the coolers 14 and 15 can be water.

A gas inlet for the compressed gas from the high-pressure compressor 10b opens into the flow cross-sections 34b and 38b immediately downstream of the regions at which the primary gas is admitted in a compressed state to these flow cross-sections. Thus the bypassed portion of the gas which was used in the secondary or auxiliary cycle is returned to the recuperative heat exchanger 3 for reheating in accordance with the principles previously set forth in which heat exchange is effected to the compressed gas from the expanded gas in the regions 34a–38a of the heat exchanger.

To control the auxiliary working-gas circulation path and hence the additional output of electrical energy, which is supplied to the main or electric-current distribution network by the generator 11 whose output is applied to the frequency converter 11a operating the generator 11b which can be connected to the mains in parallel with the generators 7, there are provided the control valves 17 and 18 in the branch line 13 and the return line 16 as mentioned previously.

Ahead of the connections between the return line 16 and the main gas circulating path, there are provided the shutoff valves 19 and 20.

These shutoff valves are closed when the additional or auxiliary generating system is brought into play. Thus, in order to increase the power output to meet a particular demand, valves 19 and 20 are closed off and valves 17 and 18 are opened to introduce heated high pressure gas from the main cycle into the turbine 9 to set the latter in operation and thereby drive both the generator 11 and the compressors 10a and 10b. The auxiliary power generating system thus operates using the closed auxiliary working-gas cycle with the secondary gas therein being heated by heat exchange with the expanded gas traversing the flow cross-sections 31a through 38a.

If the high temperature nuclear reactor 1 is brought to a higher level of thermal output, therefore, the heat which will be carried by the primary gas into the section 3a of the recuperative heat exchanger 3a will be correspondingly greater and can be transferred to the secondary circulation of the working gas.

The mass flow in the primary or main circulation is held constant by diverting gas via bypass ducts 21, each with a respective control valve 22 across the shutoff flow cross-section into the nuclear reactor 1.

In the embodiment shown in FIG. 1, the bypass ducts 21 each open into a return duct 23 of a system 24 of the nuclear power plant for abstracting excess heat from gas recirculated in the system, e.g. via a compressor 25. The latter system serves to minimize the need for additional passages and introducing gas through the walls of the reactor. Upon opening of the valves 22, members 25 of the systems 24 are opened while valves 26 remain closed. The bypass gas is thus introduced directly into high temperature reactor without traversing the recuperative heat exchanger in an amount equal to the throughput of gas which would normally be recirculated by the compressors 25.

In the nuclear power plant of FIG. 1 the same working gas employed for the main or primary circulating path or operation is used as the gas circulated in the auxiliary or secondary system. Preferably, the chambers which are customarily provided for the main gas in the recuperative heat exchanger are also used for heating the secondary gas for the peak energy generation. This of course reduces the overall operating and capital cost of the system.

The bypass system makes use of the rejected-heat return ducts to allow the primary working fluid to be connected to the high temperature reactor in a particularly convenient and economical manner.

In the embodiment of FIG. 2, the secondary working system is completely separate from the primary circulation. The fluid in the secondary circulation is heated in a portion of the recuperative heat exchanger, i.e. in flow cross-sections 31b, 32b and 35b, 36b of the heat exchanger 3a, 3b. These chambers are connected in the circulating path by gas ducts 27 feeding the turbine 28. The gas outlets from the turbine 28 are applied to coolers 31 (functionally similar to the coolers 5) which feed into the low pressure turbines 29a. The gas outputs from the turbines 29a feed into the coolers 32 (functionally similar to the coolers 6) which communicate with the high pressure turbine 29b returning the secondary working fluid to the flow cross-sections 31b, 32b, 35b, 36b.

The generator 30 forms part of the auxiliary turbine set with the turbine 28 and the compressors 29a and 29b. The rotors of these compressors, the turbine 28 and the generator 30 are all connected to the same shaft.

The cooling medium for the coolers 31 and 32 is water.

It will be apparent that the secondary circulation of FIG. 2, while functionally identical to that of FIG. 1, differs in that is is completely independent of the primary circulation. Thus it is possible to use in the secondary circulation a gas different from air when the primary fluid is air or to use air as the secondary fluid when the primary fluid is air or to use air as the secondary fluid when the primary fluid is a different gas.

It is possible, therefore, to use as the secondary circulation gas a gas with a higher molecular weight than the primary circulation gas, for example, nitrogen or argon.

The fluid of the secondary circulation and the pressure level can be selected to minimize cost or increase operating efficiency.

The bypass duct 33 is provided in the power plant of FIG. 2 for a portion of the working-gas of the primary circulation after compression. The bypass, naturally, bridges the recuperative heat exchanger and is rendered effective via valves 34 and 35. The valves 34 and 35 are opened to compensate for the mass flow difference between nonuse and use of the heat exchangers of the auxiliary cycle. Intermediate positions of valves 34 and 35 may also be employed depending upon the extent to which the auxiliary power generating cycle is to be effective.

An auxiliary turbine 36 can be connected via a clutch 38 to the shaft of the primary power generating or turbine set. This turbine 36, whose throughput can be controlled by the valve 37, can be driven by the gas heated in the high temperature reactor 1. This can accommodate the primary energy generating system to any additional mass flow of gas via lines 33. The disengageable clutch 38 can be automatic and may be mechanical, electromagnetic or hydraulic. The use of the secondary circulation of the auxiliary turbine 36 generates electric power to meet any brief increase in peak demand with, of course, a corresponding adjustment of the thermal output of the nuclear reactor 1.

I claim:

1. A method of operating a nuclear plant which comprises the steps of:
   (a) heating a primary working gas in a high temperature nuclear reactor;
   (b) driving at least one primary turbine set with the primary gas heated in step (a) by passing the heated primary gas through a turbine and displacing at least one compressor of said set connected to said turbine, and driving an electrical generator of said set to generate electric power thereby expanding said primary gas;
   (c) abstracting heat from said primary gas subsequent to step (b) by recuperative heat exchange;
   (d) compressing the primary gas from which heat is abstracted in step (c);
   (e) heating the compressed primary gas of step (d) by said recuperative heat exchange and introducing the recuperatively heated primary gas into said nuclear reactor for further heating therein in step (a);
   (f) upon the development of an increased electrical power demand, heating a secondary gas by said recuperative heat exchange from a portion of the expanded primary gas of step (b);
   (g) driving an auxiliary turbine set and electric power generator with the secondary gas heated by recuperative heat exchange in step (f) and
   (h) compressing the secondary gas subsequent to step (g) and recirculating the compressed secondary gas to recuperative heating in step (f), the secondary gas being circulated along a path excluding said reactor through steps (f), (g) and (h) while being heated exclusively by said portion of the primary gas recirculated through steps (a), (b), (c), (d) and (e).

2. The method defined in claim 1 wherein the secondary gas is recirculated in steps (f), (g) and (h) along a closed path wholly independent of said primary gas.

3. The method defined in claim 1 wherein said secondary gas is initially diverted from a portion of the primary gas and thereafter is circulated exclusively along said path.

4. The method defined in claim 1 wherein said primary gas has a composition different from that of said secondary gas.

5. The method defined in claim 1, further comprising the step of bypassing a portion of the primary gas recirculated to said nuclear reactor across the recuperative heat exchange after the compression thereof upon the recuperative heating of said secondary gas in step (f).

6. A nuclear power plant comprising:
   a high-temperature nuclear reactor;
   at least one primary turbine set including at least one turbine, at least one compressor coupled with said turbine and driven thereby, said turbine being connected to said high-temperature nuclear reactor so as to be driven by a primary gas circulated therethrough;
   a recuperative heat exchanger traversed by said primary gas and connected to said turbine whereby residual heat is abstracted from said primary gas in said heat exchanger after traversing said turbine;
   means for passing said primary gas through said compressor subsequent to the abstraction of heat therefrom in said recuperative heat exchanger;
   means for passing at least part of the compressed primary gas from said compressor through said recuperative heat exchanger for heating therein and returning the recuperatively heated compressed primary gas to said nuclear reactor;
   means for passing a secondary gas through at least a portion of said recuperative heat exchanger to heat said secondary gas therein;
   a secondary turbine set including a turbine, compressor and (upon development of an increased power demand actuating) electric-power generator connected to said recuperative heat exchanger and driven by the secondary gas heated therein; and
   means for recirculating said secondary gas from the compressor of said secondary turbine set to said recuperative heat exchanger for the heating of the secondary gas therein whereby said secondary turbine set contributes electric power to meet increased power demand.

7. The apparatus defined in claim 6 wherein the means for passing the secondary gas through said heat exchanger and said secondary turbine set includes a closed cycle independent from said primary gas.

8. The apparatus defined in claim 6 wherein said heat exchanger is provided with means for diverting a portion of said primary gas as said secondary gas to said secondary turbine set.

9. The apparatus defined in claim 6, further comprising an auxiliary turbine connectible to said primary turbine set and operable to drive the generator of said primary turbine set with primary gas upon operation of said secondary turbine set.

10. The apparatus defined in claim 6, further comprising means for bypassing a portion of the primary gas from the compressor of said primary set to said reactor without heating the compressed primary gas in said heat exchanger during operation of said secondary turbine set.

11. The apparatus defined in claim 6, further comprising a water-cooled cooler traversed by the gas ahead of each of said compressors.

* * * * *